United States Patent [19]

Murayama et al.

[11] 4,362,070
[45] Dec. 7, 1982

[54] CHANGE SPEED APPARATUS FOR A TRACTOR

[75] Inventors: Yoshinobu Murayama, Sakai; Tetsuaki Hayashi, Osaka, both of Japan

[73] Assignee: Kubota, Ltd., Osaka, Japan

[21] Appl. No.: 181,343

[22] Filed: Aug. 26, 1980

[30] Foreign Application Priority Data

Aug. 30, 1979 [JP] Japan .................................. 54-112189

[51] Int. Cl.³ ........................ F16H 15/10; F16H 17/04
[52] U.S. Cl. ..................................................... 74/691
[58] Field of Search ................ 74/194, 196, 197, 690, 74/691

[56] References Cited

U.S. PATENT DOCUMENTS 3,204,476 9/1965 Rouverol ........................ 74/690 X

FOREIGN PATENT DOCUMENTS 53-147166 12/1978 Japan ..................................... 74/691

Primary Examiner—Allan D. Herrmann
Attorney, Agent, or Firm—Cushman, Darby & Cushman

[57] ABSTRACT

A change speed apparatus for a tractor comprising a combination of frictional stepless change speed means and planetary reduction means. A large diameter gear is used to drive the frictional stepless change speed means by means of engine output, and the frictional stepless change speed means includes a large diameter driven disc which engages an outer periphery of an internal gear of the planetary reduction means to be axially movable but not rotatable relative to the internal gear. The planetary reduction means is located in a space defined by the large diameter gear and the frictional stepless change speed means.

4 Claims, 5 Drawing Figures

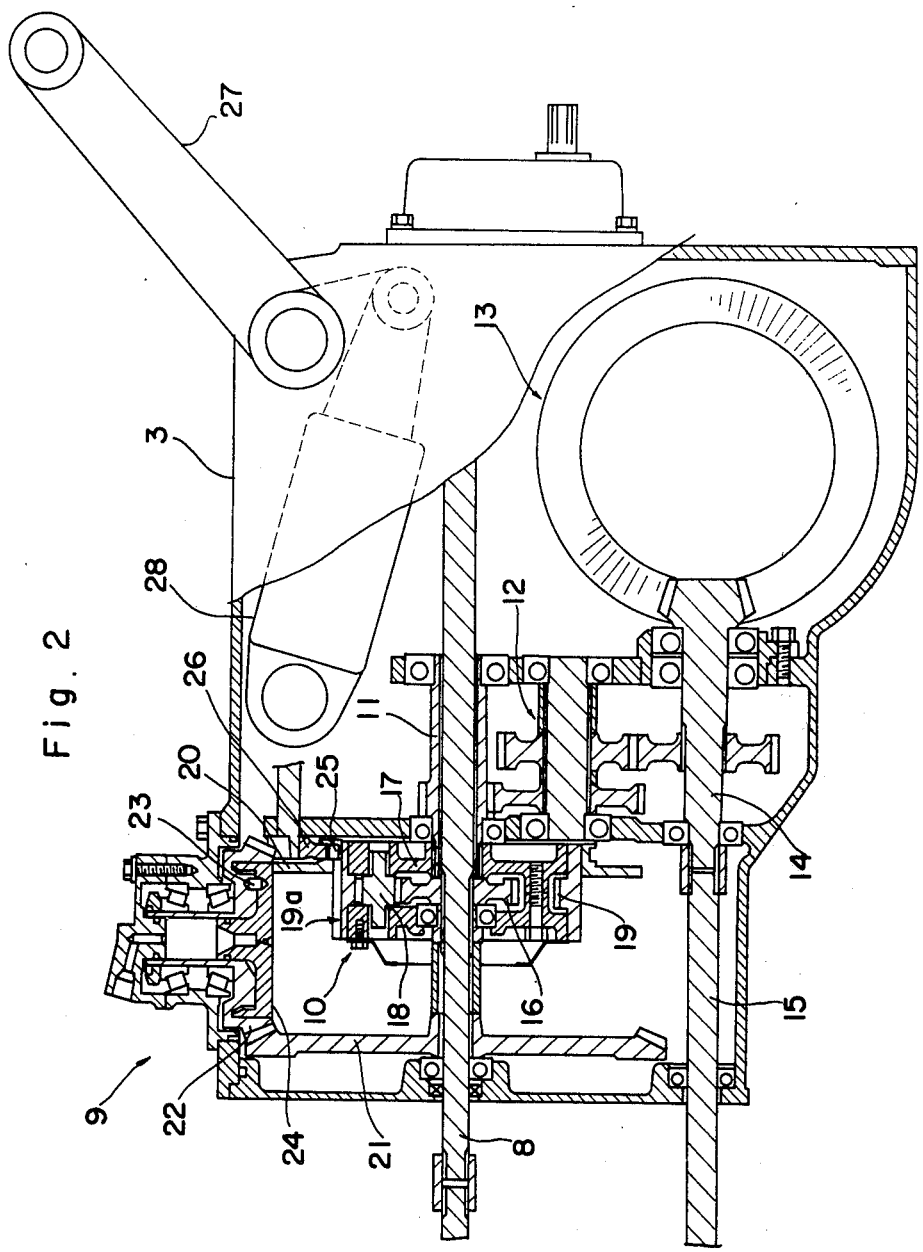

CHANGE SPEED APPARATUS FOR A TRACTOR

BACKGROUND OF THE INVENTION (1) Field of the Invention

This invention relates to a change speed apparatus for a tractor comprising planetary reduction means including a sun gear mounted on a main shaft rotatable by engine output, planet gears meshing with the sun gear, and an internal gear meshing with the planet gears, frictional stepless change speed means including a driven disc operatively connected to the internal gear, and a plurality of drive discs contacting an outer periphery of the driven disc and adapted to rotate on axes normal to a rotational axis of the driven disc, and a gear mounted on the main shaft to drive the frictional stepless change speed means, the driven disc being axially shiftable to steplessly change the revolving speed of the planet gears corresponding to the travelling speed of the tractor.

(2) Description of the Prior Art

To steplessly change the travelling speed, the above change speed apparatus utilizes a mechanical construction which is less expensive than a hydraulic stepless change speed mechanism combining varied hydraulic elements. Moreover, the change speed apparatus of this invention utilizes a planetary reduction means which despite its compactness is adapted to provide large reduction, and therefore the frictional stepless change speed means is operable in high speed ranges suited for high transmission efficiency. However, in a known apparatus as disclosed in U.S. patent application Ser. No. 70,461, filed Aug. 28, 1979, now abandoned, of the present applicants, for example, the planetary reduction means and the frictional stepless change speed means are disposed away from each other and the internal gear of the former is operatively connected to the driven disc of the latter through a separately provided interlocking means comprising a shaft and gear. Such an apparatus has disadvantages of lacking in compactness and of complicated and costly construction requiring many constituent elements. Another such prior art construction is disclosed in Federal Republic of Germany laying-open gazette No. 2,207,033.

A further disadvantage of the known apparatus is that their construction does not allow the driven disc to have a large diameter. It is therefore impossible to arrange many drive discs on the periphery of the driven disc; the driven disc has to be rotated by few drive discs, each dealing with a heavy torque load, and slips can occur easily between the drive discs and the driven disc.

SUMMARY OF THE INVENTION

This invention has been made noting the foregoing state of the art, and its object is to provide a change speed apparatus having a compact overall construction and of low manufacturing costs by improving the interlocking between the internal gear of the planetary reduction means and the driven disc of the frictional stepless change speed means.

To attain this object, a change speed apparatus for a tractor according to this invention as described under the Field of the Invention is characterized in that the gear mounted on the main shaft to drive the frictional stepless change speed means has a large diameter, the planetary reduction means is located in a space defined by the large diameter gear and the drive discs, and the driven disc engages the outer periphery of the internal gear to be axially movable but not rotatable relative to the internal gear.

The whole apparatus is made compact by locating the planetary reduction means in a space defined by the large diameter gear and the frictional stepless change speed means as described. Furthermore, the provision of the large diameter gear permits the driven disc engaging the outer periphery of the internal gear of the planetary reduction means to have a large diameter, and many drive discs to be arranged peripherally of the driven disc to drive the driven disc. Thereby per disc torque transmission is made small and the possibility of slipping between the drive discs and the driven disc is diminished. Because of the direct engagement between the driven disc and the internal gear, special means such as gears, shafts and the like for interlocking the two members are no longer necessary, which contributes toward the low cost of the apparatus. It will be understood from the foregoing that the invention provides a change speed apparatus for a tractor having great practical advantages.

Other objects and advantages of this invention will be apparent from the following description.

BRIEF DESCRIPTION OF THE DRAWINGS

In the drawings illustrating a change speed apparatus for a tractor according to the invention;

FIG. 2 is a developed side view in vertical section showing the change speed apparatus.

DETAILED DESCRIPTION OF THE PREFERRED EMBODIMENT

Figure 1:
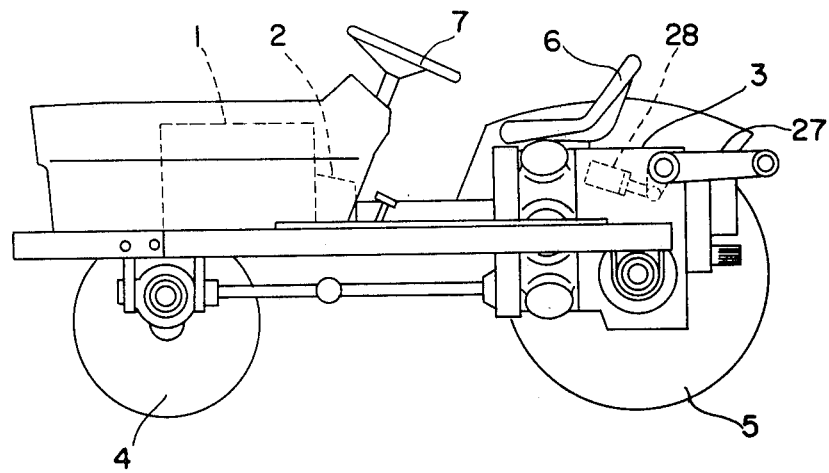
FIG. 1 is a side elevation of a tractor.

FIG. 1 shows a side elevation of an agricultural tractor of the four wheel drive type which comprises an engine 1, a travelling clutch housing 2, a transmission case 3, dirigible front wheels 4, rear wheels 5, a driver's seat 6, and a steering wheel 7. The tractor further comprises a lift arm 27 for vertically movably suspending a working implement connected to a rear portion of the tractor and a hydraulic cylinder 28 for causing vertical oscillations of the lift arm 27.

Referring to FIG. 2 showing an interior of the transmission case 3, engine output is transmitted to a main shaft 8 through a travelling clutch (not shown), and then to a change speed apparatus comprising a frictional stepless change speed means 9 and a planetary reduction means 10 where the engine output is changed to a desired speed. From the change speed apparatus power is transmitted to a tubular shaft 11, and through a gear interlocking mechanism 12 to a pinion shaft 14 of a differential mechanism 13 for rear wheel drive. Part of the power is transmitted from the pinion shaft 14 to a transmission shaft 15 for front wheel drive.

Figure 3:
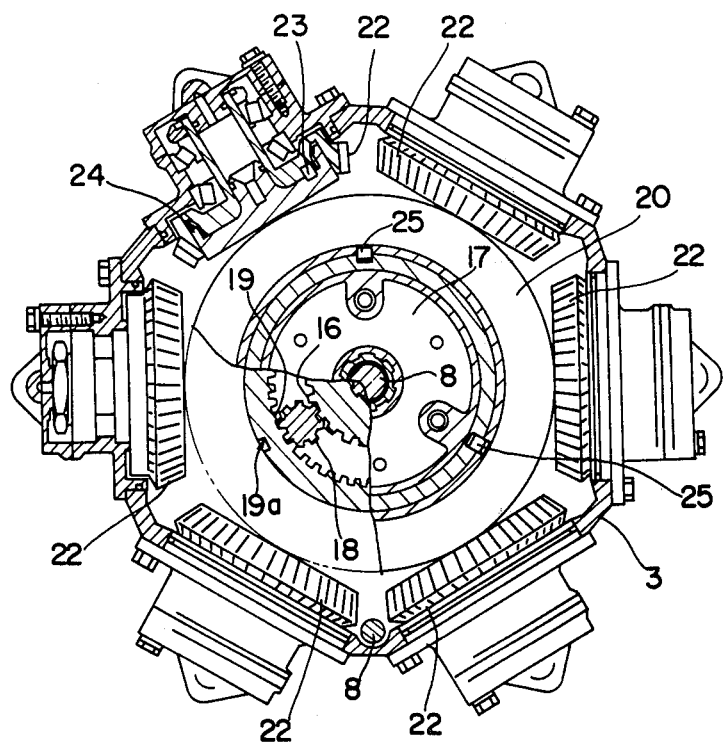
FIG. 3 is a rear view, partly broken away, showing the change speed apparatus.

Referring to FIGS. 2 and 3, the planetary reduction means 10 comprises a sun gear 16 fixed to the main shaft 8 for integral rotation therewith, planet gears 18 meshing with the sun gear 16 and rotatably supported by a carrier 17 fixed to the shaft 11, and an internal gear 19 meshing with the planet gears 18. The frictional stepless change speed means 9 comprises a driven disc 20 engaging an outer periphery of the internal gear 19, and six drive discs 24 rotatable on axes normal to a rotational axis of the driven disc 20 and hydraulically thrust biased to engage an outer periphery of the driven disc 20. The driven disc 20 is in engagement with the internal gear 19 by means of grooves 19a defined on the outer periphery of the internal gear 19 and pins 25 protruding from an inner peripheral wall of the driven disc 20 and fitted into the groove 19a whereby the driven disc 20 is axially movable but not rotatable relative to the internal gear 19. Each of the drive discs 24 is pinned as at 23 to a small diameter bevel gear 22 not to be rotatable relative to each other, and the small diameter bevel gear 22 is in mesh with a large diameter bevel gear 21 fixed to the main shaft 8. A shift fork 26 is provided to effect shifting of the driven disc 20. By axially shifting the driven disc 20, the points of contact between the driven disc 20 and the drive discs 24 are radially changed to steplessly change the rotational speed of the driven disc 20. Then the rotational speed of the internal gear 19 is steplessly changed which leads to stepless changes in the revolving speed of the planet gears 18 or the rotational speed of the shaft 11 resulting in travelling speeds, both backward and forward, of the tractor.

Figure 4:
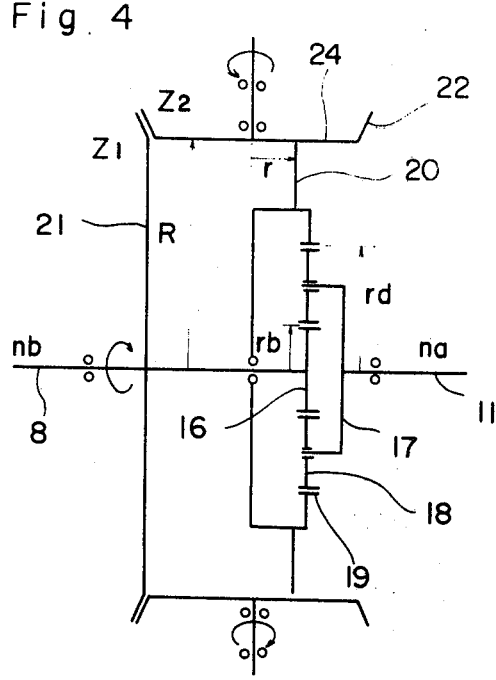
FIG. 4 is a side view showing a principle of planetary reduction means.
Figure 5:
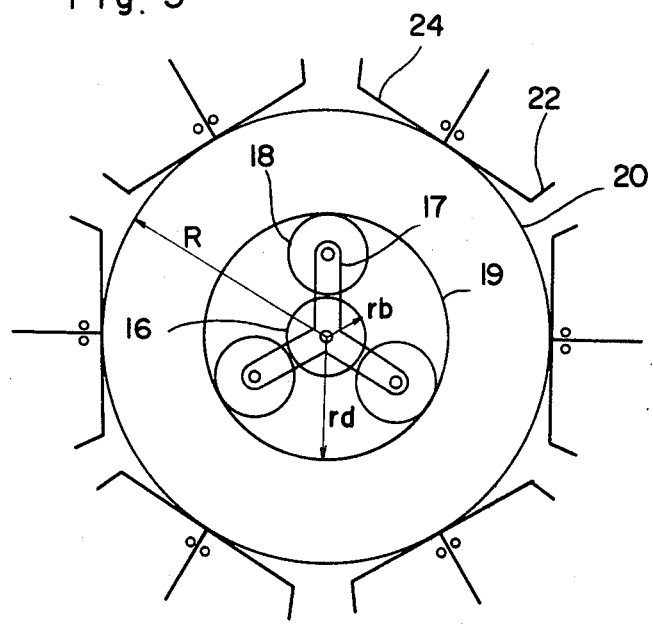
FIG. 5 is a front view showing the principle of the planetary reduction means.

Description is hereinafter made of backward and forward change speed operation and change speed ranges with reference to FIGS. 4 and 5. The symbols used herein represent the following:

nb ... rotational rate of the main shaft 8
na ... rotational rate of the carrier 17 and shaft 11
nd ... rotational rate of the internal gear 19
Z1 ... number of teeth of the large diameter bevel gear 21
Z2 ... number of teeth of the small diameter bevel gear 22
R ... distance between the main shaft axis and the drive disc surface
r ... amount of eccentricity of the driven disc 20 relative to the drive disc center
rb. radius of pitch circle of the sun gear 16
rd ... radius of pitch circle of the internal gear 19

The rotational rate na of the carrier 17 when the internal gear 19 or the sun gear 16 is held stationary is as shown in the following table:

| stationary | driven | rotational rate of sun gear 16 | rotational rate of internal gear 19 | rotational rate na of carrier 17 |
|---|---|---|---|---|
| internal gear 16 | sun gear 16 | nb | 0 | $nb \cdot \frac{rb}{rb + rd}$ |
| sun gear 16 | internal gear 19 | 0 | nd | $nd \cdot \frac{rd}{rb + rd}$ |

Therefore, the rotational rate na of the carrier 17 when both the sun gear 16 and the internal gear 19 are driven is expressed as follows:

$$na = nb \cdot \frac{rb}{rb + rd} + nd \cdot \frac{rd}{rb + rd}$$

In this case, $$nd = -nb \cdot \frac{Z1}{Z2} \cdot \frac{r}{R},$$

and so $$na = \frac{nb}{1 + M}\left(1 - M \cdot \frac{Z1}{Z2} \cdot \frac{r}{R}\right)$$

wherein M = (rd/rb)
Therefore, when $$1 - M \cdot \frac{Z1}{Z2} \cdot \frac{r}{R} = 0,$$

that is r = (RZ2/MZ1), na = 0.
If r = 0, then $$na = \frac{nb}{1 + M}$$

and na > 0, and the carrier 17 rotates forward, i.e. in the direction in which the sun gear 16 rotates.
When $$1 - M \cdot \frac{Z1}{Z2} \cdot \frac{r}{R} 0,$$

that is r > (RZ2/MZ1), then na > 0 and the carrier 17 rotates reversely.

Thus, by shifting the driven disc 20 within the range of R = 0, to r1, the rotational rate na of the carrier may be steplessly changed in the range of $$\frac{nb}{1 + M} \text{ to 0 and to } -\frac{1 - M \cdot \frac{Z1}{Z2} \cdot \frac{r}{R}}{1 + M}.$$

We claim:
1. A change speed apparatus for a tractor comprising:
Planetary reduction means (10) including a sun gear (16) mounted on a main shaft (8) rotatable by engine output, planet gears (18) meshing with the sun gear (16), and an internal gear (19) meshing with the planet gears (18),
frictional stepless change speed means (9) including a driven disc (20) operatively connected to the internal gear (19), and a plurality of drive discs (24) contacting an outer periphery of the driven disc (20) and adapted to rotate on axes normal to a rotational axis of the driven disc (20), and
a gear (21) mounted on the main shaft (8) to drive the frictional stepless change speed means (9),
the driven disc (20) being axially shiftable to steplessly change the revolving speed of the planet gears (18) corresponding to the travelling speed of the tractor,
characterized in that the gear (21) mounted on the main shaft (8) to drive the frictional stepless change speed means (9) has a large diameter, the planetary reduction means (10) is located in a space defined by the large diameter gear (21) and the drive discs (24), and the driven disc (20) engages the outer periphery of the internal gear (19) to be axially movable but not rotatable relative to the internal gear (19).
2. A change speed apparatus as claimed in claim 1 characterized in that the large diameter gear (21) comprises a bevel gear, and each of the drive discs (24) has a bevel gear (22) to mesh with said bevel gear (21).
3. A change speed apparatus as claimed in claim 2 characterized in that the driven disc (20) is peripherally surrounded by six drive discs (24) arranged equidistantly with one another.

4. A change speed apparatus as claimed in claim 2 or 3 characterized in that the driven disc (20) has pins (25) provided on an inner peripheral wall thereof to engage grooves (19a) defined on the outer periphery of the internal gear (19) to thereby render the driven disc (20) axially movable but not rotatable relative to the internal gear (19).

* * * * *